United States Patent
Natarajan et al.

(10) Patent No.: US 11,064,222 B1
(45) Date of Patent: Jul. 13, 2021

(54) SYSTEM AND METHOD FOR DELIVERING CLOUD DVR CONTENT

(71) Applicant: Wipro Limited, Bangalore (IN)

(72) Inventors: Gowrishankar Subramaniam Natarajan, Torrance, CA (US); Jagan Mohan Gorti, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/815,254

(22) Filed: Mar. 11, 2020

(51) Int. Cl.
| H04N 9/80 | (2006.01) |
| H04N 9/82 | (2006.01) |
| H04N 21/218 | (2011.01) |
| H04N 21/4147 | (2011.01) |
| H04N 21/231 | (2011.01) |
| H04N 21/24 | (2011.01) |
| H04N 21/643 | (2011.01) |
| H04L 29/06 | (2006.01) |
| H04L 29/08 | (2006.01) |

(52) U.S. Cl.
CPC ... *H04N 21/2181* (2013.01); *H04N 21/23113* (2013.01); *H04N 21/2407* (2013.01); *H04N 21/4147* (2013.01); *H04N 21/64322* (2013.01)

(58) Field of Classification Search
USPC .............................. 709/219, 203, 231, 221
See application file for complete search history.

(56) References Cited

U.S. PATENT DOCUMENTS

| 9,348,488 | B1* | 5/2016 | Renema, II | G06F 3/0482 |
| 10,037,231 | B1 | 7/2018 | Jakhetiya et al. | |
| 10,616,546 | B2* | 4/2020 | Berger | G06Q 30/0267 |
| 2014/0137132 | A1* | 5/2014 | Agarwal | G06F 9/5072 718/104 |
| 2015/0188992 | A1* | 7/2015 | Ayanam | H04L 67/16 709/203 |
| 2018/0117477 | A1* | 5/2018 | Miura | H04N 21/4781 |
| 2020/0092293 | A1* | 3/2020 | Liu | H04L 63/102 |

* cited by examiner

*Primary Examiner* — Jude Jean Gilles
(74) *Attorney, Agent, or Firm* — Finnegan, Henderson, Farabow, Garrett & Dunner, LLP

(57) ABSTRACT

The present disclosure relates to a method for delivering cloud Digital Video Recording (cloud DVR) content by a media server (101). The method comprises receiving one or more inputs (205) related to cloud DVR content from one or more sources for delivering the cloud DVR content to a mobile device (104) connected to a Mobile Edge Computing (MEC) node (102). Further, the method comprises generating a plurality of dynamic vectors (206), using the received one or more inputs (205). Furthermore, the method comprises switching of a recording of the cloud DVR content between the MEC node (102) or a cloud server (103), based on the plurality of vectors and a prediction of a load on the cloud server (103). Thereafter, the method comprises caching the cloud DVR content in one of the MEC node (102) or the cloud server (103) based on the switching to deliver the cloud DVR content to the plurality of mobile devices.

17 Claims, 8 Drawing Sheets

SYSTEM AND METHOD FOR DELIVERING CLOUD DVR CONTENT

TECHNICAL FIELD

The present disclosure relates to a method and system for delivering multimedia content to streaming platforms. More particularly, the present disclosure relates to a method and system for recording and streaming cloud Digital Video Recording (DVR) content on a mobile device connected to a Mobile Edge Computing (MEC) node.

BACKGROUND

Over The Top (OTT) based delivery systems provides on-demand delivery of content to users. The content is mostly distributed to the users on mobile devices. Generally, the content is streamed without buffering or without latency when the mobile devices are connected to a fixed network such as Broadband network. However, content which are streamed live are not available to users especially when the users are mobile. Delivering the content to the users on a mobile network (e.g., 3G, 4G networks) causes latency issues. Further, congestion in the mobile network leads to a poor experience in terms of video stalling and buffering. In addition, the media quality reduces drastically when streamed using mobile networks compared to fixed networks. Typically, the content to be delivered is stored in cloud servers. The demand for the content from the users leads to increase in load at the cloud servers which may further cause latency issues. The existing media streaming technologies do not solve the above problems.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method for delivering cloud Digital Video Recording (DVR) content, where the method is performed by a media server. The method comprises receiving one or more inputs related to cloud DVR content from one or more sources for delivering the cloud DVR content to a mobile device connected to a Mobile Edge Computing (MEC) node among a plurality of MEC nodes. Further, the method comprises generating a plurality of dynamic vectors using the received one or more inputs. Furthermore, the method comprises switching of a recording of the cloud DVR content between the MEC node or a cloud server based on the plurality of vectors and a prediction of a load on the cloud server. Furthermore, the method comprises caching the cloud DVR content in one of the MEC node or the cloud server based on the switching to deliver the cloud DVR content to the plurality of mobile devices from one of the MEC node or the cloud server.

In an embodiment, the present disclosure discloses a media server for delivering cloud DVR content. The media server comprising a processor and a memory. The processor is configured to receive one or more inputs related to cloud DVR content from one or more sources for delivering the cloud DVR content to a mobile device connected to a Mobile Edge Computing (MEC) node among a plurality of MEC nodes. Further, the processor is configured to generate a plurality of dynamic vectors using the received one or more inputs. Furthermore, the processor is configured to switch a recording of the cloud DVR content between the MEC node or a cloud server based on the plurality of vectors and a prediction of a load on the cloud server. Furthermore, the processor is configured to caching the cloud DVR content in one of the MEC node or the cloud server based on the switching to deliver the cloud DVR content to the plurality of mobile devices from one of the MEC node or the cloud server.

In an embodiment, the present disclosure discloses a non-transitory computer readable medium including instructions stored thereon that when processed by at least one processor cause a computing system to deliver cloud DVR content. The media server comprising a processor and a memory. The processor is configured to receive one or more inputs related to cloud DVR content from one or more sources for delivering the cloud DVR content to a mobile device connected to a Mobile Edge Computing (MEC) node among a plurality of MEC nodes. Further, the processor is configured to generate a plurality of dynamic vectors using the received one or more inputs. Furthermore, the processor is configured to switch a recording of the cloud DVR content between the MEC node or a cloud server based on the plurality of vectors and a prediction of a load on the cloud server. Furthermore, the processor is configured to caching the cloud DVR content in one of the MEC node or the cloud server based on the switching to deliver the cloud DVR content to the plurality of mobile devices from one of the MEC node or the cloud server.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 5A:
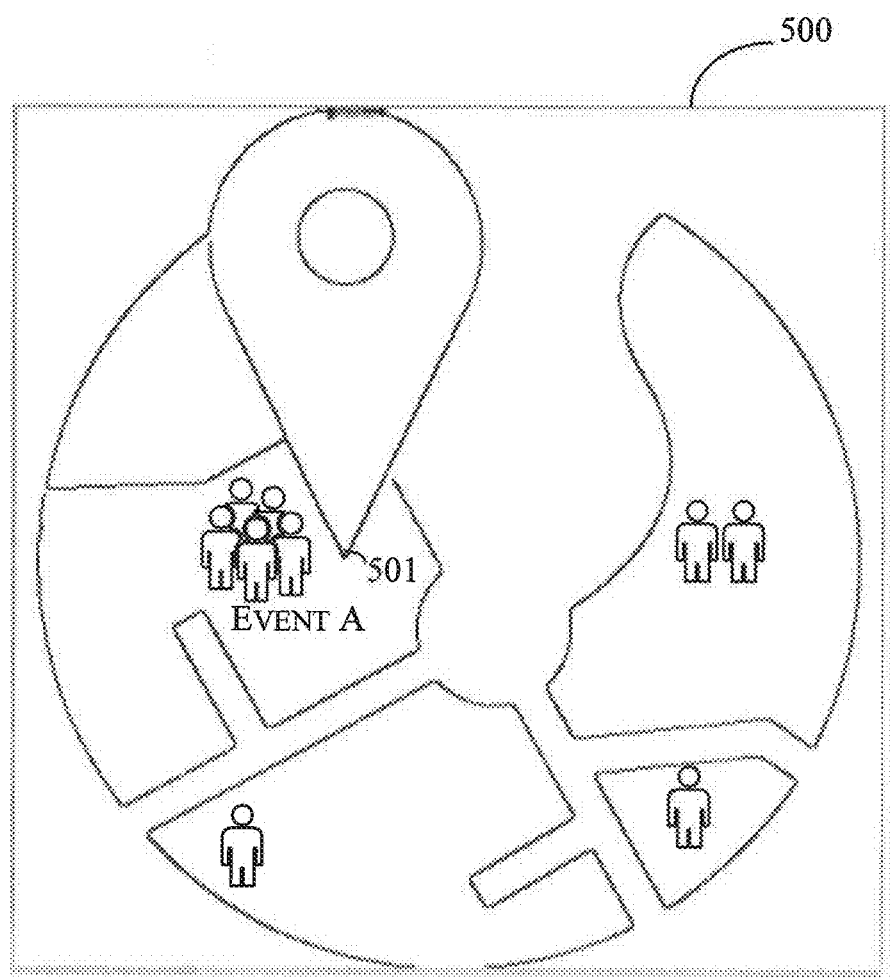
Figure 5B:
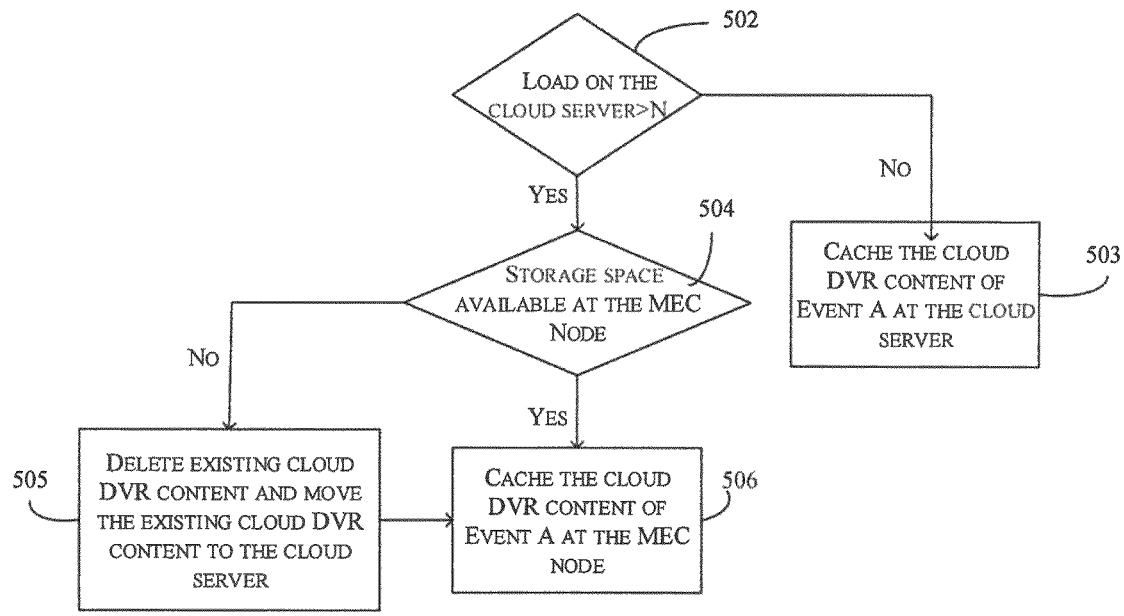
Figure 5C:
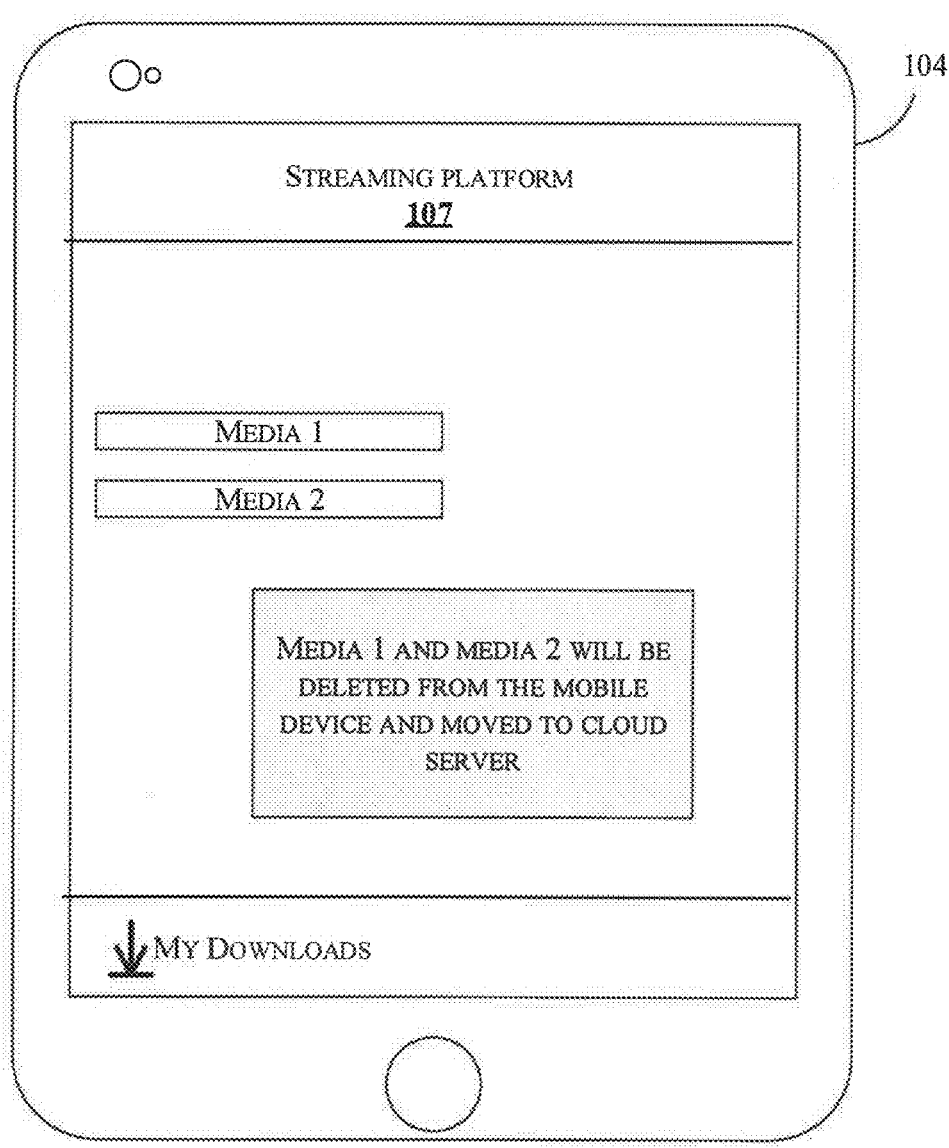
Figure 6:
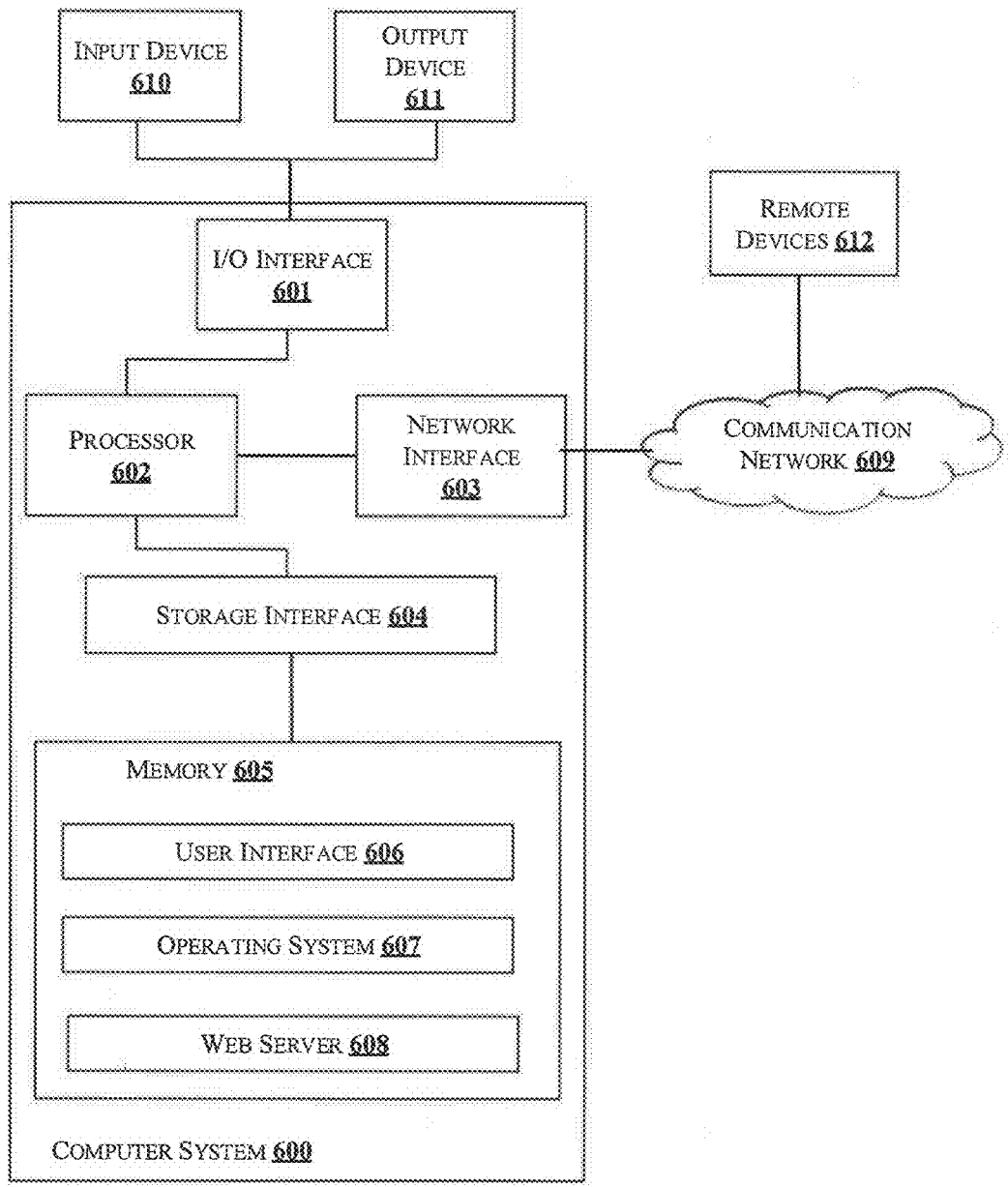

FIG. 5A, FIG. 5B and FIG. 5C show exemplary illustrations of predicting load on the cloud server and managing storage space at a MEC node based on location and popularity of content, in accordance with embodiments of the present disclosure; and FIG. 6 shows a block diagram of a general-purpose computing system for delivering cloud DVR content, in accordance with embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to method and system for delivering cloud Digital Video Recording (cloud DVR) content. The system (media server) is used to stream multimedia content on devices such as Television (TV), mobile devices, laptop, etc. The media server receives one or more inputs related to cloud DVR content from one or more sources for delivering the cloud DVR content to a mobile device connected to a Mobile Edge Computing (MEC) node such as a base station. A plurality of dynamic vectors is generated using the received one or more inputs. A recording of the cloud.DVR content is switched between the MEC node or a cloud server based on the plurality of vectors and a prediction of a load on the cloud server. The cloud DVR content is cached in one of the MEC node or the cloud server based on the switching to deliver the cloud DVR content to the plurality of mobile devices from one of the MEC node or the cloud server.

Figure 1:
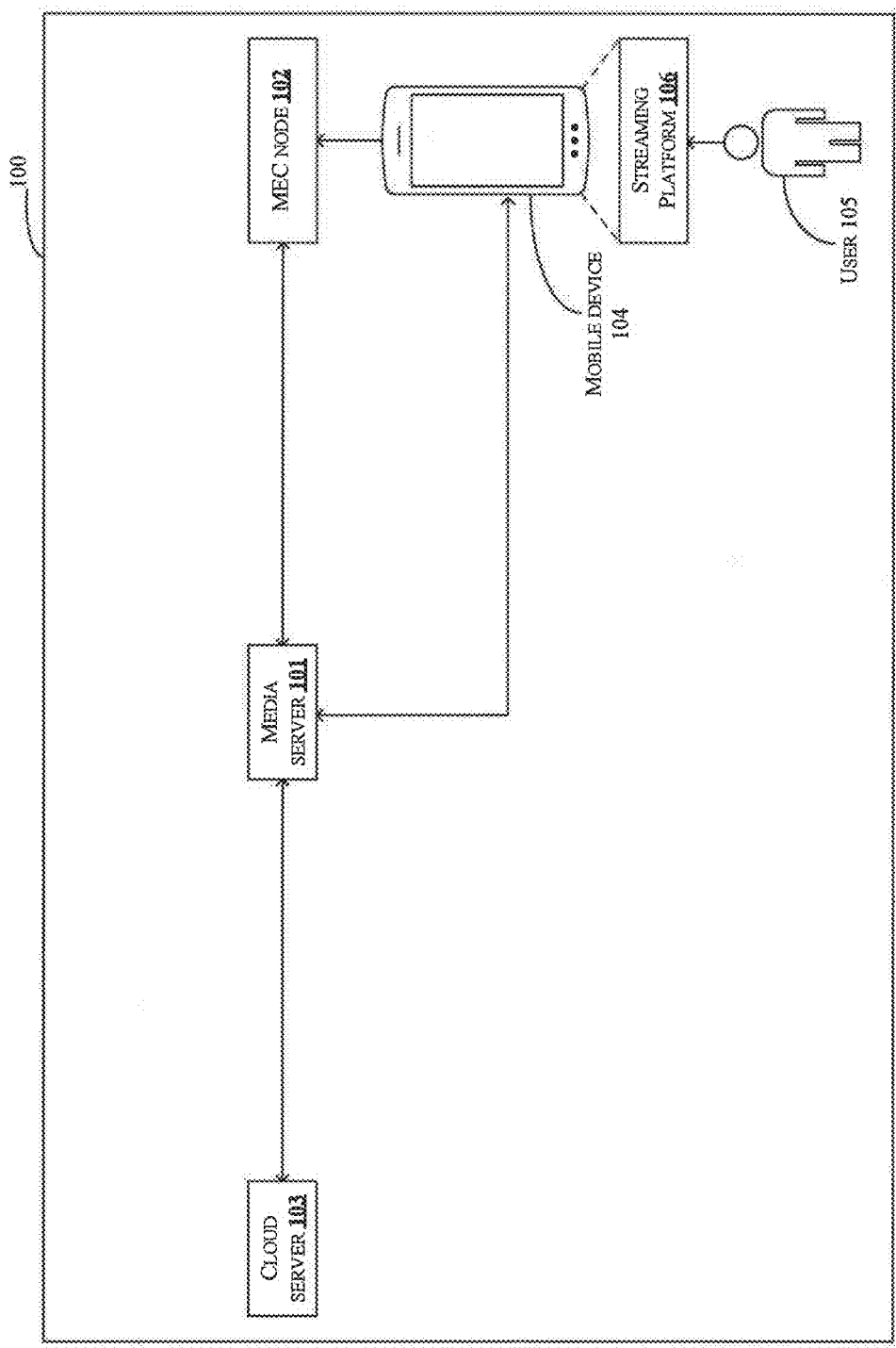
FIG. 1 shows an exemplary environment illustrating delivering cloud DVR content, in accordance with some embodiments of the present disclosure.

FIG. 1 shows an environment (100) for delivering the cloud DVR content. As shown the environment comprises a cloud server (103), a media server (101), a MEC node (102), a streaming platform (106), a mobile device (104) and a user (105). In an embodiment, the cloud server (103) may be a database hosted on a cloud platform configured to store multimedia content such as text, graphics, video, audio and the like. The cloud server (103) may also record live content. In an embodiment, the cloud server (103) may store cloud Digital Video Recording (cloud DVR) content. The cloud DVR refers to storing multimedia content in a data center associated with the streaming platform (106) on the cloud server (103). The media server (101) may be configured to retrieve the cloud DVR content from the cloud server (103) and stream on the mobile device (104). In one embodiment, the media server (101) may comprise a cloud platform to host the database. In such a scenario, a dedicated cloud server (103) may not be required and the cloud server (103) may be part of the media server (101). In another embodiment, the cloud server (103) and the media server (101) may be different servers and may be associated with each other. The MEC node (102) enables cloud computing capabilities and an Information Technology (IT) service environment at an edge of a cellular network. MEC technology is implemented at cellular base stations or other edge nodes. In present disclosure, the MEC node (102) may refer to a base station connected to a mobile device (104) associated with a user (105). In an embodiment, the MEC node (102) may store the cloud DVR content and stream the cloud DVR content on the mobile device (104). The mobile device (104) may include, but is not limited to, a smartphone, a personal computer, a laptop, a tablet, or the like. The mobile device (104) may be connected to the MEC node (102) via mobile communication networks such as LTE, GSM, 3GPP and the like. The mobile device (104) may host the streaming platform (106). In an embodiment, the streaming platform (106) may be an application configured to interact with the user (105) and enable streaming of the cloud DVR content. For example, the streaming platform (106) may be Netflix™, Hotstar™, Tata™ Sky™, and the like. The streaming platform (106) may use a user interface of the mobile device (104) to stream the cloud DVR content. For example, the streaming platform (106) may access microphone, speaker and display unit of the mobile device (104). In an embodiment, the cloud DVR content is streamed via the streaming platform (106) on the mobile device (104). When the present disclosure mentions that media is streamed on the mobile device (104), a person skilled in the art should appreciate that such streaming is via the streaming platform (106). The media server (101) may receive one or more inputs related to the cloud DVR content from one or more sources. The one or more sources may include, but not limited to, the streaming platform (106), the cloud server (103), the MEC node (102), one or more databases, the mobile device (104) and the user (105). The user (105) may refer to a person using the streaming platform (106) on the mobile device (104). The one or more databases may be, but not limited to, weather Application Programming Interfaces (APIs), Map APIs, recent news posted in news channel websites, and social media platforms. The media server (101) may generate a plurality of dynamic vectors using the received one or more inputs. The media server (101) may facilitate streaming of the cloud DVR content based on the generated one or more dynamic vectors determined using the one or more inputs received from the one or more sources. The media server (101) may switch a recording ofthe cloud DVR content between the MEC node (102) or the cloud server (103) based on the plurality of vectors and a prediction of a load on the cloud server (103). The load on the cloud server (103) may be based on at least one of, scheduled requests for the recording or the streaming of the cloud DVR content, a popularity of the cloud DVR content, a location of the mobile device (104) or the location of the cloud DVR content being streamed, and a routine followed by users the user (105) associated with the mobile devices. The media server (101) may cache the cloud DVR content in one of the MEC node (102) or the cloud server (103) based on the switching. When the cloud DVR content is cached at the cloud server (103), the cloud DVR content may be delivered to the mobile device (104) via the MEC node (102) in real-time. When the cloud DVR content is cached at the MEC node (102), the cloud DVR content may be delivered directly from the MEC node (102) to the mobile device (104).

Figure 2:
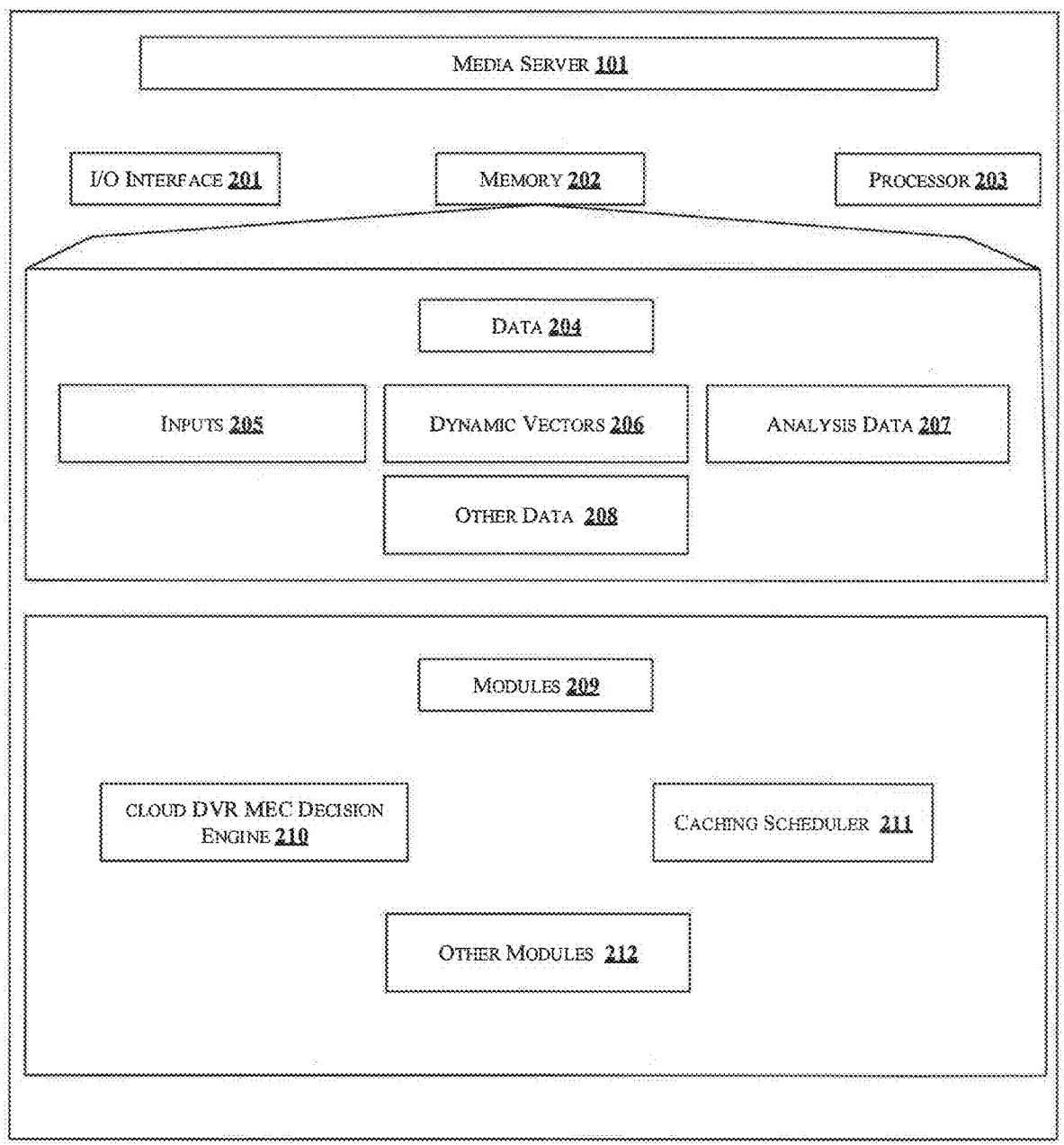
FIG. 2 shows an internal architecture of a media server for delivering cloud DVR content, in accordance with some embodiments of the present disclosure.

FIG. 2 illustrates internal architecture of the media server (101) in accordance with some embodiments of the present disclosure. The media server (101) may include at least one Central Processing Unit ("CPU" or "processor")(203) and a memory (202) storing instructions executable by the at least one processor (203). The processor (203) may comprise at least one data processor for executing program components for executing user or system-generated requests. The memory (202) is communicatively coupled to the processor (203). The computing unit (105) further comprises an Input/Output (I/O) interface (201). The I/O interface (201) is coupled with the processor (203) through which an input signal or/and an output signal is communicated.

In an embodiment, data (204) may be stored within the memory (202). The data (204) may include, for example, inputs (205), dynamic vectors (206), analysis data (207), and other data (208).

In an embodiment, the inputs (205) are also referred as one or more inputs (205). The one or more inputs (205) comprises at least one of a mobility of the user (105) associated with the mobile device (104), Internet Protocol (IP) address, plurality of MEC nodes associated with the mobile device (104), preferences of the user (105) related to the cloud DVR content, scheduled requests from the users, number of users viewing the cloud DVR content at a given time, a network backhaul overload, a storage availability at the MEC node (102), and a network type. The media server (101) may receive the one or more inputs (205) related to the cloud DVR content from one or more sources. The one or more sources may be the streaming platform (106), the cloud server (103), the MEC node (102), the one or more databases, the mobile device (104), and the user (105).

In an embodiment, the dynamic vectors (206) are also referred as a plurality of dynamic vectors (206). The plurality of dynamic vectors (206) may be generated from the received one or more inputs (205). A vector may be a machine-readable representation of inputs (205). The vector may indicate plurality of parameters about the inputs (205). For example, a vector of user (105) preference of cloud DVR content may indicate a type of data (text), about the cloud DVR content (video, or audio or image) and the like. The vector may have an information about the cloud DVR content in the machine-readable representation. The plurality of vectors may be used to determine relationship between the one or more inputs (205). For example, a location of the user (105) and type of cloud DVR content may be related. Cricket may be popular in India. The number of people viewing the cricket in India may be greater than other countries. Hence, the streaming of cricket may be localized to India. In another example, scheduled requests from the users and number of users viewing the cloud DVR content at a given time may be related. If the schedule requests are high, the server may determine that a greater number of users may view the cloud DVR content at the same time.

In an embodiment, the analysis data (207) may comprise the data related to the switching and the caching of the cloud DVR content. The media server (101) may switch and cache the cloud DVR content after analysing the generated plurality of dynamic vectors (206) and the prediction of the load on the cloud server (103). For example, the media server (101) may analyse determine that a cricket match is scheduled to be streamed on a particular day in a particular location. The media server (101) may analyse the popularity of the cricket in the particular location and may predict that the cloud server (103) may be loaded with requests on particular date. Hence, the media server (102) may decide to cache the cloud DVR content at the MEC node (102). Another example may include, the media server (101) analysing a storage space of the MEC node (102). When the recording of a live content is big enough the exceed the storage space of the MEC node (102), the media server (101) may decide to cache the live content at the cloud server (103).

In an embodiment, the other data (208) may include data related to scheduling the caching of the cloud DVR content in the MEC node (102). The media server (101) may schedule the caching of the cloud DVR content in the MEC node (102) based on the generated plurality of dynamic vectors (206) and the prediction of the load on the cloud server (103).

In an embodiment, the data (204) in the memory (202) may be processed by modules (210) of the media server (101). As used herein, the term modules (209) refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. The modules (209) when configured with the functionality defined in the present disclosure will result in a novel hardware.

In one implementation, the modules (209) may include, for example, a cloud DVR MEC decision engine (210), a caching scheduler (211) and other modules (212). It will be appreciated that such aforementioned modules (209) may be represented as a single module or a combination of different modules.

In an embodiment, the cloud DVR MEC decision engine (210) may receive the one or more inputs (205) from the one or more sources. As described, the one or more sources may include the streaming platform (106), the cloud server (103), the MEC node (102), the one or more databases, the mobile device (104), and the user (105). The cloud DVR MEC decision engine (210) may generate the plurality of dynamic vectors (206) based on the one or more inputs (205). Further, the cloud DVR MEC decision engine (210) may switch the recording of the cloud DVR content between the MEC node (102) or the cloud server (103), based on the plurality of vectors (206) and a prediction of a load on the cloud server (103). The prediction of the load on the cloud server (103) may be based on at least one of scheduled requests for the recording or the streaming of the cloud DVR content, a popularity of the cloud DVR content, a location of the mobile device (104), a location of streaming the cloud DVR content, a routine followed by the user (105). The cloud DVR NEC decision engine (210) may compute a decision tree technique to schedule the recording either in the MEC node (102) or the cloud server (103) to ensure end-to-end Quality-of-Service delivery of the cloud DVR content. In one embodiment, the cloud DVR MEC decision engine (210) may be implemented in the media server (101). In another embodiment, the cloud DVR MEC decision engine (210) may be implemented in the media server (101) and the MEC node (102) as first and second cloud DVR MEC decision engine (210). In such scenario, the functions of the cloud DVR MEC decision engine (210) may be distributed between the first and second cloud DVR MEC decision engine (210) and such configuration may be a master slave configuration. A decision tree master engine is implemented on the media server (101) and a decision tree slave engine is implemented MEC node (102). Based on the switching, when the recording is at the MEC node (102), the decision tree master engine instructs a decision slave engine running on the MEC node (102) to record the cloud DVR content. The decision slave engine sends the status of the recording, bandwidth information to the decision tree master engine.

In an embodiment, the media server (101) may cache the CLOUD DVR content either at the MEC node (102) or the cloud server (103). The caching scheduler (211) may schedule the caching of the cloud DVR content in the MEC node (102) based on the generated plurality of dynamic vectors (206) and the prediction of the load on the cloud server (103). For example, number of users in a locality requesting streaming of event A and event B may be large. The media server (101) may schedule the caching of the event A and the event B based on the number of users. If the number of users requesting the streaming of the event A is greater than the number of users requesting the streaming of the event B, the caching scheduler (211) may schedule the caching of the event A first in the MEC node (102) and may cache the event B in the cloud server (103).

In an embodiment, the other modules (212) may comprise a scheduler for scheduling the recording of the cloud DVR content. The scheduler may schedule the recording of the cloud DVR content based on the generated plurality of dynamic vectors (206) and the prediction of the load on the cloud server (103). For example, the user (105) may be interested in a video available for downloads in the streaming platform (106). The user may have a routine to watch the videos after 8 PM. Since after 8 PM, the number of recordings may be more, the scheduler may schedule the recording of the video before 8 PM.

Figure 3:
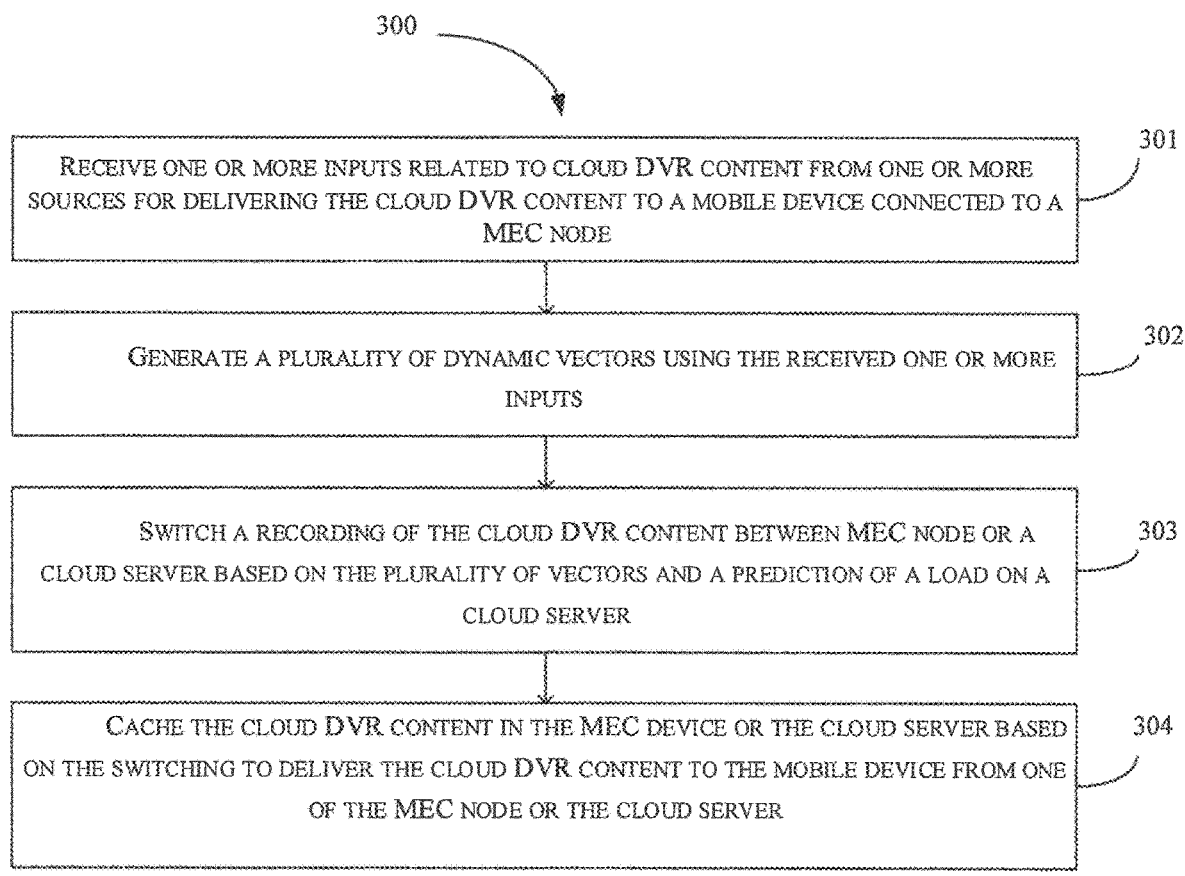
FIG. 3 shows an exemplary flow chart illustrating method steps for delivering cloud DVR content, in accordance with some embodiments of the present disclosure.

FIG. 3 shows a flow chart illustrating a method for delivering the cloud DVR content, in accordance with some embodiments of the present disclosure. As illustrated in FIG. 3, the method (300) may comprise one or more steps. The method (300) may be described in the general context of computer executable instructions. Generally, computer executable instructions can include routines, programs, objects, components, data structures, procedures, modules, and functions, which perform particular functions or implement particular abstract data types.

The order in which the method (300) is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step (301), receiving, by the media server (101), the one or more inputs (205) related to the cloud DVR content from the one or more sources for delivering the cloud DVR content to the mobile device (104). The media server (101) may receive the one or more inputs (205) related to the cloud DVR content from one or more sources. The one or more inputs (205) comprises at least one of, a mobility of the user (105) associated with the mobile device (104), Internet Protocol (IP) address, plurality of MEC nodes associated with the mobile device (104), preferences of the user (105) related to the cloud DVR content, schedule requests from the users, number of users viewing the cloud DVR content at a given time, a network backhaul overload, a storage availability at the MEC node (102), and a network type. The one or more sources may be the streaming platform (106), the cloud server (103), the MEC node (102), the one or more databases, the mobile device (104) and the user (105). For example, the streaming platform (106) may provide the preferences of the user (105). The cloud server (103) may provide the number of schedule requests. The MEC node (102) may provide the network type. The one or more databases may provide number of users viewing the cloud DVR content at the given time. The database here may refer to a local news. The mobile device (104) may provide information of the storage availability. The user (105) may provide the preferences to the cloud DVR content. The streaming platform (106) may provide the user preferences to the media server (101). The user (105) may have created a user profile and may have given the preferences of movies, series, and the content the user is interested. The streaming platform (106) may observe a viewing history of the user (105) and may provide inputs about the preferences of the user (105) to the media server (101). The MEC node (102) may provide the bandwidth based on a number of users connected to the MEC node, and the network type. The number of users viewing the cloud DVR content may be determined using a number of mobile devices currently the media server (101) is serving.

At step (302), generating, by the media server (101), the plurality of dynamic vectors (206), using the received one or more inputs (205). The plurality of dynamic vectors (206) may be generated from the received one or more inputs (205). The vector may have an information about the cloud DVR content in the machine-readable representation. The plurality of vectors may be used to determine relationship between the one or more inputs (205). For example, the number of users viewing the cloud DVR content in a locality may be related to the bandwidth of the MEC node in the locality.

At step (303), switching, by the media server (101), of a recording of the cloud DVR content between the MEC node (102) or the cloud server (103), based on the plurality of vectors (206) and the prediction of the load on the cloud server (103). The cloud DVR MEC decision engine (210) may switch the recording of the cloud DVR content between the MEC node (102) or the cloud server (103), based on the plurality of vectors (206) and the prediction of the load on the cloud server (103). The prediction of the load on the cloud server (103) may be based on at least one of scheduled requests for the recording or the streaming of the cloud DVR content, a popularity of the cloud DVR content, a location of the mobile device (104), a routine followed by users associated with the mobile devices. The load on the cloud server (103) may be calculated based on several factors. The load on the cloud server (103) may be more when number of mobile devices accessing the cloud server (103) is more than a threshold, number of content streamed at a time is more than a threshold, number of recording requests is more, and the like. The threshold may vary dynamically based on a user profile, network traffic conditions, concurrent load on the cloud server (103), user quality of experience criteria, number of subscriptions to the content and the like. The load on the cloud server (103) may be predicted, for example, using social media servers depending on the number of users confirmed to watch a program. The number of viewers may be more when a political rally is streamed. The media server (101) may predict the load on the cloud server (103) based on the routine followed by the users. A student knowledge program may be streamed on a TV after 6 PM in the evening as the students may not be at home during daytime.

At step (304), caching, by the media server (101), the cloud DVR content in one of the MEC node (102) or the cloud server (103) based on the switching. The cloud DVR MEC decision engine (210) may cache the cloud DVR content either at the MEC node (102) or the cloud server (103) based on the switching.

Figure 4:
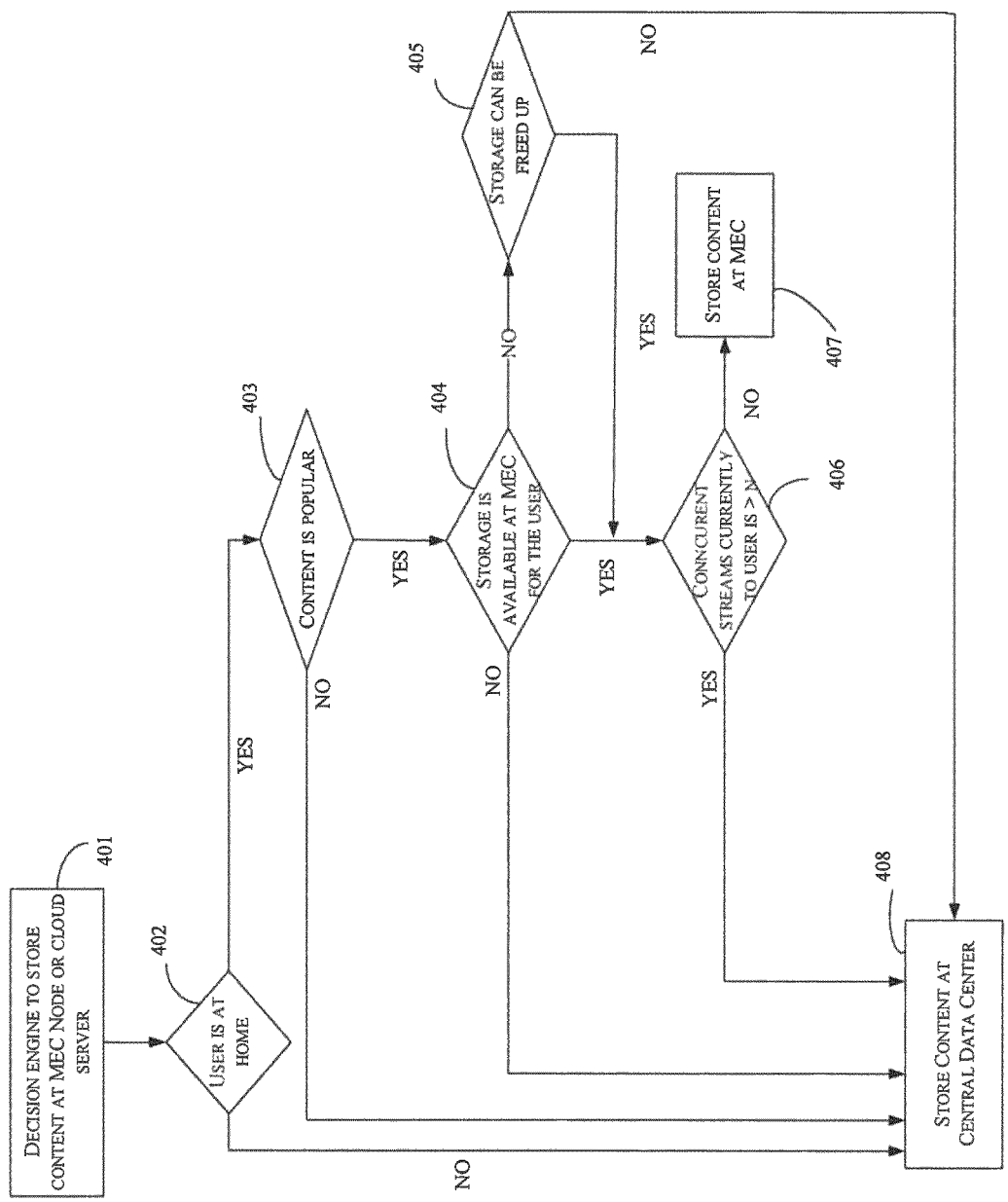
FIG. 4 shows an exemplary flowchart illustrating switching of a recording of cloud DVR content between the MEC node or a cloud server, in accordance with some embodiments of the present disclosure.

FIG. 4 describes various scenarios where the cloud DVR content is cached in one the cloud server (103) or the MEC node (102). At step (401), the cloud DVR MEC decision engine (210) may decide to cache of the cloud DVR content either at the MEC node (102) or the cloud server (103). At step (402), the cloud DVR MEC decision engine (210) may determine if the user (105) is at home or mobile based on the one or more inputs (205). If the user (105) is not at home, the user (105) the cloud DVR MEC decision engine (210) may cache the cloud DVR content at the cloud server (103). At step (403), the cloud DVR MEC decision engine (210) may determine if the content is popular based on the prediction of the load on the cloud server (103). If the content is not popular, the number of viewers viewing the cloud DVR content may be less. Hence, the cloud DVR MEC decision engine (210) may cache the cloud DVR content at the cloud server (103) as the cloud server (103) may not be loaded. If the content is popular, the cloud DVR content may have to be cached at the MEC node (102). At step (404), the cloud DVR MEC decision engine (210) may determine if the storage space is available at the MEC node (102). If the storage space is not available at the MEC node (102), at step (405), the cloud DVR MEC decision engine (210) may determine if the storage space can be freed up based on the preferences of the user (105). Based on a viewing history of the user (105), if the user (105) has viewed a video, the video may be deleted and moved to the cloud. If the storage space cannot be freed up, the cloud DVR MEC decision engine (210) may cache the cloud DVR content at the cloud server (103). At step (406), the cloud DVR MEC decision engine (210) may determine the number of current concurrent streams. If the number of current concurrent streams is not greater than a threshold (N), the cloud DVR MEC decision engine (210) may cache the cloud DVR content at the MEC node (102). If the number of current concurrent streams is greater than N, the cloud DVR MEC decision engine (210) may cache the cloud DVR content at the cloud server (103). If the steps 402, 403, 404, 405 is true, at step (407), the cloud DVR MEC decision engine (210) may cache the cloud DVR content at the MEC node (102).

Reference is now made to FIGS. 5A, 5B and 5C. FIG. 5A shows an exemplary environment (500). The cloud DVR content related to an event A has to be delivered to users. The event may be a cricket tournament. The environment (500) depicts a location (501) on a map. A maximum number of users interested in the event A are in the location (501). Numbers of users subscribed for the event A from the location (501) are greater compared to other locations. The popularity of the event A may be more in the location (501). The media server (101) may predict the content popularity based on the one or more inputs received form the location (501). The cricket match may be cached at the MEC node (102) to reduce latency. Locations other than the location (501) may stream the cricket match from the cloud server (103) as popularity may be less and load on the cloud server (103) may be less.

A routine followed by the users may include number of hours the user is present in home on a daily basis, time taken by the user (105) for travelling or the time spent by the user (105) is in any location other than home. Patterns of such data may be recorded using location services or network services of the mobile device (104) of the user to determine the routine of the user (105). In this example consider event A as a TV series streamed in the afternoon and repeated in the evening. For example, the user (105) may be travelling to office in between 8 AM to 10 AM in the morning. The user (105) may be present in the office between 10 AM to 6 PM. The user (105) may travel back to home in between 7 PM to 8 PM. Reference is now made to FIG. 5B. At step (502), the media server (101) may predict the load on the cloud server (103) on a daily basis and. The load on the cloud server (103) may be increased after 8 PM as many users may be at home and popular content may be scheduled for evening time, hence, more users are likely to stream after 8 PM. If the load on the cloud server (103) is not greater than the threshold (e.g., during afternoon hours), at step (503) the media server (101) may cache the cloud DVR content relates to the event A at the cloud server (103). If the load on the cloud server (103) is greater than the threshold (e.g., evening hours), at step (504) the media server (101) may check the storage space available at the MEC node (102). If the storage space is available, at step (506) the media server (101) may cache the cloud DVR content related to the event A at the MEC node (102). At step (505), the media server (101) may delete the existing cloud DVR content in the mobile device (104) and move the existing cloud DVR content to the cloud server (103). For example, upon determining that the previously cached content in the MEC node (102) is watched by the user (105), the media server (101) may move the cached content to the cloud server (103). Alternatively, the media server (101) may also delete the content cached in the MEC node (102) after a predefined time period.

Reference is now made to FIG. 5C. If the load on the cloud server (103) is greater than the threshold the media server (101) may check the storage space available at the MEC node (102). If the storage space is available, the media server (101) may cache the cloud DVR content related to the event A at the MEC node (102). If the storage space is not available, the media server (101) may delete the existing cloud DVR content in the mobile device (104) and move the existing cloud DVR content to the cloud server (103). FIG. 5C shows the streaming platform (106) on the mobile device (104). A recording may have to be cached at the MEC node (102). FIG. 5C shows the downloaded cloud DVR content: media 1 and media 2 in the streaming platform (106). In an embodiment, the streaming platform (106) may use storage space of the mobile device (104) to store the downloaded content. The media server (101) may delete media 1 and media 2 in the mobile device (104) and move media 1 and media 2 to the cloud server (103) to empty storage space in the mobile device (104). For example, the streaming platform (106) may provide a pop-up on the screen that the media 1 and media 2 will be deleted and moved to the cloud server (103). The media server (101) may then cache the recording at the MEC node (102) for streaming on the mobile device (104).

The present disclosure dynamically determines whether to record multimedia content at a MEC node or at a cloud server when a user initiates a recording. Since the MEC node enables cloud computing capabilities at an edge of a cellular network, the latency in delivering the multimedia content is reduced, if the multimedia content is recorded at the MEC node. The present disclosure manages the delivery of the cloud DVR content. If the load on the cloud server is less, then the recording is performed in the cloud server. The present disclosure considers user's mobility pattern, users viewing pattern and content popularity.

Computer System

FIG. 6 illustrates a block diagram of an exemplary computer system (600) for implementing embodiments consistent with the present disclosure. In an embodiment, the computer system (600) is used to implement generation of sentiment-based summary for user reviews. The computer system (600) may comprise a central processing unit ("CPU" or "processor") (602). The processor (602) may comprise at least one data processor. The processor (602) may include specialized processing units such as integrated system (bus) controllers, memory management control units, floating point units, graphics processing units, digital signal processing units, etc.

The processor (602) may be disposed in communication with one or more input/output (I/O) devices (not shown) via I/O interface (601). The I/O interface (601) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface (601), the computer system (600) may communicate with one or more I/O devices. For example, the input device (610) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (611) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system (600) is connected to the remote devices (612) through a communication network (609). The remote devices (612) may provide the user reviews to the computing network 600. The processor (602) may be disposed in communication with the communication network (609) via a network interface (603). The network interface (603) may communicate with the communication network (609). The network interface (603) may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network (609) may include, without limitation, a direct interconnection, local area network (LAN), wide area network (WAN), wireless network (e.g., using Wireless Application Protocol), the Internet, etc. Using the network interface (603) and the communication network (609), the computer system (600) may communicate with the scene remote devices (612). The network interface (603) may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network (609) includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor (602) may be disposed in communication with a memory (605) (e.g., RAM, ROM, etc. not shown in FIG. 6) via a storage interface (604). The storage interface (604) may connect to memory (605) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (605) may store a collection of program or database components, including, without limitation, user interface (606), an operating system (607), web server (608) etc. In some embodiments, computer system (600) may store user/application data, such as, the data, variables, records, etc., as described in this disclosure. Such databases may be implemented as fault-tolerant, relational, scalable, secure databases such as Oracle® or Sybase®.

The operating system (607) may facilitate resource management and operation of the computer system (600). Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLER IOS™, GOOGLER ANDROID™, BLACKBERRY® OS, or the like.

In some embodiments, the computer system (600) may implement a web browser (608) stored program component. The web browser (608) may be a hypertext viewing application, for example MICROSOFT® INTERNET EXPLORER™, GOOGLE® CHROME™⁰, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers (608) may utilize facilities such as AJAX™, DHTML™, ADOBE® FLASH™, JAVASCRIPT™, JAVA™, Application Programming Interfaces (APIs), etc. In some embodiments, the computer system (600) may implement a mail server stored program component. The mail server may be an Internet mail server such as Microsoft Exchange, or the like. The mail server may utilize facilities such as ASP™, ACTIVEX™, ANSI™ C++/C #, MICROSOFT®, .NET™, CGI SCRIPTS™, JAVA™, JAVASCRIPT™, PERL™, PHP™ PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system (800) may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 3, 4 and 5B show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for delivering cloud Digital Video Recording (cloud DVR) content comprising:
   receiving, by a media server, one or more inputs related to cloud DVR content from one or more sources for delivering the cloud DVR content to a mobile device connected to a Mobile Edge Computing (MEC) node among a plurality of MEC nodes;
   generating, by the media server, a plurality of dynamic vectors, using the received one or more inputs;
   switching, by the media server, of a recording of the cloud DVR content between the MEC node or a cloud server, based on the plurality of dynamic vectors and a prediction of a load on the cloud server; and
   caching, by the media server, the cloud DVR content in one of the MEC node or the cloud server based on the switching, wherein the cloud DVR content is delivered to the plurality of mobile devices from one of the MEC node or the cloud server.

2. The method of claim 1, wherein the one or more inputs comprises at least one of, a mobility of a user associated with the mobile device, Internet Protocol (IP) address, MEC node associated with the mobile device, preferences of the user related to the cloud DVR content, schedule requests from the users, number of users viewing the cloud DVR content at a given time, a network backhaul overload, a storage availability at the MEC node, and a network type.

3. The method of claim 1, wherein the one or more sources comprises at least one of the, streaming platform, the cloud server, the MEC node, the one or more databases, the mobile device and the user.

4. The method of claim 1, wherein the prediction of the load on the cloud server is based on at least one of schedule requests for the recording or the streaming of the cloud DVR content, a popularity of the cloud DVR content, a location of the mobile device, a routine followed by users associated with the mobile devices.

5. The method of claim 1, wherein caching comprises scheduling the caching of the cloud DVR content in the MEC node based on the load on the cloud server.

6. The method of claim 1, wherein the caching comprises managing storage space in the MEC node, wherein managing storage space comprises deleting existing cloud DVR content and moving the existing cloud DVR content from the MEC node to the cloud server.

7. The method of claim 1, wherein the recording of the cloud DVR content is switched to the MEC node when the load on the cloud server exceeds a threshold.

8. A media server for delivering cloud Digital Video Recording (cloud DVR) content comprising:
   one or more processors;
   a memory, wherein the memory coupled to the one or more processors is configured to execute programmed instructions stored in the memory comprising:
   receive one or more inputs related to cloud DVR content from one or more sources for delivering the cloud DVR content to a mobile device connected to a Mobile Edge Computing (MEC) node among a plurality of MEC nodes;
   generate a plurality of dynamic vectors, using the received one or more inputs;

switch a recording of the cloud DVR content between at least one of a plurality of MEC nodes or a cloud server, based on the plurality of vectors and a prediction of a load on the cloud server;

cache the cloud DVR content in at least one of the MEC devices or the cloud server based on the switching, wherein the cloud DVR content is delivered to the plurality of mobile devices from one of the MEC nodes or the cloud server.

9. The media server of claim 8, wherein the one or more processors predicts the load on the cloud server is based on at least one of schedule requests for the recording or the streaming of the cloud DVR content, a popularity of the cloud DVR content, location of the mobile device, a routine followed by users associated with the mobile devices.

10. The media server of claim 8, wherein the one or more processors schedules the caching of the cloud DVR content based on the load on the cloud server.

11. The media server of claim 8, wherein the one or more processors switches the recording of the cloud DVR content to the MEC nodes, when the load on the cloud server exceeds a threshold.

12. The media server of claim 8, wherein the one or more processors manages a storage space in the MEC node, wherein managing storage space comprises deleting existing cloud DVR content and moving the existing cloud DVR content from the MEC node to the cloud server.

13. A non-transitory computer readable medium including instructions stored thereon that when processed by at least one processor cause a media server to, receive one or more inputs related to cloud DVR content from one or more sources for delivering the cloud DVR content to a mobile device connected to a Mobile Edge Computing (MEC) node among a plurality of MEC nodes;

generate a plurality of dynamic vectors, using the received one or more inputs;

switch a recording of the cloud DVR content between at least one of a plurality of MEC nodes or a cloud server, based on the plurality of vectors and a prediction of a load on the cloud server;

cache the cloud DVR content in at least one of the MEC devices or the cloud server based on the switching, wherein the cloud DVR content is delivered to the plurality of mobile devices from one of the MEC nodes or the cloud server.

14. The medium of claim 13, wherein the one or more processors predicts the load on the cloud server is based on at least one of schedule requests for the recording or the streaming of the cloud DVR content, a popularity of the cloud DVR content, location of the mobile device, a routine followed by users associated with the mobile devices.

15. The medium of claim 13, wherein the one or more processors schedules the caching of the cloud DVR content based on the load on the cloud server.

16. The medium of claim 13, wherein the one or more processors switches the recording of the cloud DVR content to the MEC nodes, when the load on the cloud server exceeds a threshold.

17. The medium of claim 13, wherein the one or more processors manages a storage space in the MEC node, wherein managing storage space comprises deleting existing cloud DVR content and moving the existing cloud DVR content from the MEC node to the cloud server.

* * * * *